United States Patent
Vatter et al.

(10) Patent No.: US 11,383,479 B2
(45) Date of Patent: Jul. 12, 2022

(54) HAIR CLEANING IMPLEMENT

(71) Applicant: The Procter & Gamble Company, Cincinnati, OH (US)

(72) Inventors: Michael Lee Vatter, Okeana, OH (US); James Terry Knapmeyer, Cincinnati, OH (US)

(73) Assignee: The Procter and Gamble Company, Cincinnati, OH (US)

( * ) Notice: Subject to any disclaimer, the term of this patent is extended or adjusted under 35 U.S.C. 154(b) by 161 days.

(21) Appl. No.: 16/828,322

(22) Filed: Mar. 24, 2020

(65) Prior Publication Data

US 2021/0299482 A1    Sep. 30, 2021

(51) Int. Cl.

| B32B 3/30 | (2006.01) |
|---|---|
| B32B 27/12 | (2006.01) |
| A46B 5/04 | (2006.01) |
| A46B 9/00 | (2006.01) |
| A61Q 5/00 | (2006.01) |
| B32B 5/02 | (2006.01) |
| B32B 5/26 | (2006.01) |

(Continued)

(52) U.S. Cl.
CPC ............... *B32B 3/30* (2013.01); *A46B 9/005* (2013.01); *A61Q 5/00* (2013.01); *B32B 5/022* (2013.01); *B32B 27/12* (2013.01); *A01K 13/002* (2013.01); *A46B 5/04* (2013.01); *A46B 2200/01* (2013.01); *A46B 2200/102* (2013.01); *A46B 2200/104* (2013.01); *B08B 1/006* (2013.01); *B32B 5/26* (2013.01); *B32B 33/00* (2013.01); *B32B 2262/12* (2013.01); *B32B 2323/04* (2013.01); *B32B 2323/10* (2013.01); *B32B 2432/00* (2013.01); *Y10T 428/24182* (2015.01); *Y10T 428/24479* (2015.01); *Y10T 428/24612* (2015.01); *Y10T 428/24777* (2015.01); *Y10T 428/31* (2015.01); *Y10T 442/641* (2015.04); *Y10T 442/66* (2015.04); *Y10T 442/674* (2015.04)

(58) Field of Classification Search
None
See application file for complete search history.

(56) References Cited

U.S. PATENT DOCUMENTS

| 4,041,203 A | 8/1977 | Brock et al. |
|---|---|---|
| 4,374,888 A | 2/1983 | Bornslaeger |

(Continued)

FOREIGN PATENT DOCUMENTS

| CA | 2480748 C | 3/2013 |
|---|---|---|
| EP | 1512390 A1 | 3/2005 |

(Continued)

OTHER PUBLICATIONS

Keyence, Area Roughness Parameters, Oct. 2016 (Year: 2016).*
PCT Search Report and Written Opinion for PCT/US2021/022946 dated Jun. 18, 2021,15 pages.

*Primary Examiner* — Jeffrey A Vonch
(74) *Attorney, Agent, or Firm* — John G. Powell

(57) ABSTRACT

A hair cleaning implement in the form of a laminate with surface properties specifically tailored to improve sebum removal from hair. The implement includes a nonwoven material joined to a film to form a laminate and a plurality of discrete protrusions extending from the surface of the nonwoven material. The protrusions are configured to provide the desired surface properties to the implement.

19 Claims, 15 Drawing Sheets

(51) Int. Cl.
    *B32B 33/00*     (2006.01)
    *B08B 1/00*     (2006.01)
    *A01K 13/00*     (2006.01)

(56) References Cited

U.S. PATENT DOCUMENTS

| | | | |
|---|---|---|---|
| 4,741,941 A * | 5/1988 | Englebert | A61F 13/51121 19/301 |
| 4,758,467 A | 7/1988 | Lempriere | |
| 5,180,620 A * | 1/1993 | Mende | D04H 1/74 428/137 |
| 5,242,632 A * | 9/1993 | Mende | D04H 1/56 264/518 |
| 5,518,801 A | 5/1996 | Chappell et al. | |
| 5,691,035 A | 11/1997 | Chappell et al. | |
| 5,723,087 A | 3/1998 | Chappell et al. | |
| 5,843,057 A | 12/1998 | Mccormack | |
| 5,885,909 A | 3/1999 | Rudisill et al. | |
| 5,891,544 A | 4/1999 | Chappell et al. | |
| 5,916,663 A | 6/1999 | Chappell et al. | |
| 6,027,483 A | 2/2000 | Chappell et al. | |
| 6,087,279 A * | 7/2000 | Laun | D04H 1/498 442/403 |
| 6,109,214 A | 8/2000 | Rampersad | |
| 6,153,208 A | 11/2000 | McAtee et al. | |
| 6,190,678 B1 | 2/2001 | Hasenoehrl et al. | |
| 6,280,757 B1 | 8/2001 | Mcatee et al. | |
| 6,391,835 B1 | 5/2002 | Gott et al. | |
| 6,638,527 B2 | 10/2003 | Gott et al. | |
| 6,649,155 B1 | 11/2003 | Dunlop et al. | |
| 6,810,553 B1 * | 11/2004 | Otsuji | A45D 19/00 15/210.1 |
| 6,835,701 B2 | 12/2004 | Seipel et al. | |
| 7,127,801 B2 | 10/2006 | Lahiri et al. | |
| 7,514,071 B2 | 4/2009 | Simon et al. | |
| 7,527,615 B2 | 5/2009 | Roe et al. | |
| 8,349,300 B2 | 1/2013 | Wells | |
| 8,475,817 B2 | 7/2013 | Hasenoehrl et al. | |
| 9,204,775 B2 | 12/2015 | Pung et al. | |
| 9,278,054 B2 | 3/2016 | Avery et al. | |
| 9,974,424 B2 | 5/2018 | Roe et al. | |
| 10,045,888 B2 | 8/2018 | Strube | |
| 10,045,889 B2 | 8/2018 | Strube | |
| 10,182,949 B2 | 1/2019 | Strube | |
| 10,364,406 B2 | 7/2019 | Gizaw et al. | |
| 10,391,041 B2 | 8/2019 | Nishizawa | |
| 2001/0051479 A1 * | 12/2001 | Fereshtehkhou | B32B 5/26 15/208 |
| 2003/0176132 A1 * | 9/2003 | Moriyasu | B08B 1/006 442/361 |
| 2003/0211802 A1 * | 11/2003 | Keck | A47L 13/16 15/228 |
| 2003/0228352 A1 | 12/2003 | Hasenoehrl et al. | |
| 2004/0081679 A1 | 4/2004 | Simon et al. | |
| 2004/0204333 A1 * | 10/2004 | Dobrin | A61Q 19/10 510/438 |
| 2005/0112328 A1 * | 5/2005 | Schaeffer | C11D 17/049 428/156 |
| 2005/0125877 A1 | 6/2005 | Benjamin et al. | |
| 2005/0148260 A1 * | 7/2005 | Kopacz | B32B 5/26 442/381 |
| 2005/0196371 A1 | 9/2005 | Decoster et al. | |
| 2005/0229349 A1 | 10/2005 | Foser | |
| 2006/0210774 A1 * | 9/2006 | Linzell | B08B 7/0028 428/174 |
| 2007/0041929 A1 | 2/2007 | Torgerson | |
| 2007/0130713 A1 * | 6/2007 | Chen | A47L 13/256 15/228 |
| 2007/0155645 A1 | 7/2007 | Eisfeld et al. | |
| 2007/0212401 A1 | 9/2007 | Masse | |
| 2007/0283516 A1 * | 12/2007 | Rasmussen | A01K 13/002 15/160 |
| 2008/0035174 A1 | 2/2008 | Aubrun-sonneville | |
| 2008/0083420 A1 | 4/2008 | Glenn et al. | |
| 2008/0087293 A1 | 4/2008 | Glenn et al. | |
| 2008/0148504 A1 | 6/2008 | Kuo | |
| 2008/0199501 A1 | 8/2008 | Potin | |
| 2008/0206355 A1 | 8/2008 | Schwartz et al. | |
| 2008/0292574 A1 | 11/2008 | Uehara | |
| 2008/0292575 A1 | 11/2008 | Uehara | |
| 2013/0280192 A1 | 10/2013 | Carter et al. | |
| 2014/0121626 A1 * | 5/2014 | Finn | D04H 1/495 156/196 |
| 2014/0283865 A1 | 9/2014 | Avery et al. | |
| 2014/0366293 A1 * | 12/2014 | Roe | A47L 13/17 15/104.93 |
| 2016/0000661 A1 | 1/2016 | Van et al. | |
| 2016/0074251 A1 * | 3/2016 | Strube | B32B 3/30 428/178 |
| 2016/0074252 A1 * | 3/2016 | Strube | D04H 1/74 428/172 |
| 2016/0074254 A1 * | 3/2016 | Orr | A61F 13/5116 428/161 |
| 2016/0120243 A1 | 5/2016 | Matzel | |
| 2017/0022660 A1 * | 1/2017 | Suer | D21H 27/002 |
| 2017/0056933 A1 * | 3/2017 | Yamada | D21H 27/38 |
| 2017/0258650 A1 * | 9/2017 | Rosati | D04H 11/08 |
| 2017/0259524 A1 * | 9/2017 | Neton | A61F 13/537 |
| 2018/0360288 A1 * | 12/2018 | Bradley | B32B 9/02 |
| 2018/0371377 A1 | 12/2018 | Sherry et al. | |

FOREIGN PATENT DOCUMENTS

| | | | |
|---|---|---|---|
| EP | 1618925 A1 | 1/2006 | |
| EP | 1709996 A1 | 10/2006 | |
| EP | 2777770 A1 | 9/2014 | |
| FR | 2897262 A1 | 8/2007 | |
| GB | 1175278 A | 12/1969 | |
| JP | 58141132 A * | 8/1983 | |
| JP | 08000521 A * | 1/1996 | |
| JP | 2001055319 A | 2/2001 | |
| JP | 2001157646 A * | 6/2001 | |
| JP | 2001161616 A * | 6/2001 | |
| JP | 2003093152 A | 4/2003 | |
| JP | 2004168698 A | 6/2004 | |
| JP | 2005028015 A * | 2/2005 | |
| JP | 2005095386 A * | 4/2005 | |
| JP | 2013155466 A | 8/2013 | |
| JP | 2015073619 A * | 4/2015 | D04H 1/495 |
| JP | 2015120673 A | 7/2015 | |
| JP | 2015189726 A | 11/2015 | |
| JP | 2015189727 A | 11/2015 | |
| JP | 2015189728 A | 11/2015 | |
| JP | 2015193621 A | 11/2015 | |
| WO | 02080727 A2 | 10/2002 | |
| WO | 2008044198 A1 | 4/2008 | |
| WO | 2008044200 A1 | 4/2008 | |
| WO | 2009057046 A2 | 5/2009 | |
| WO | 2012090412 A1 | 7/2012 | |
| WO | WO-2015198949 A1 * | 12/2015 | D04H 1/495 |

\* cited by examiner

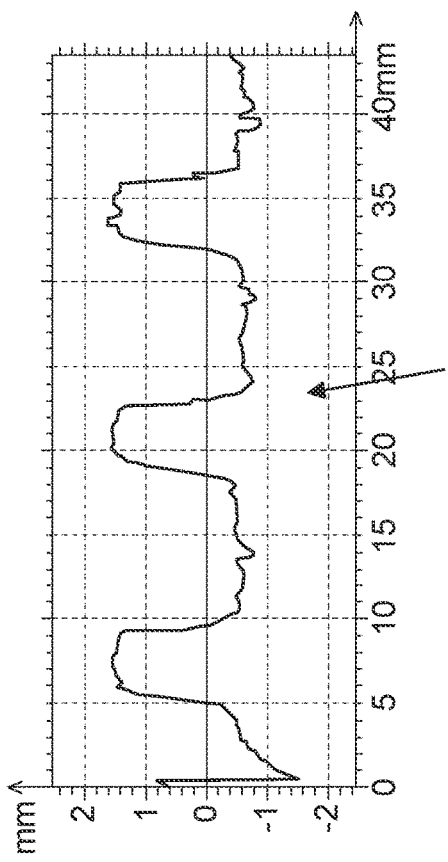
FIG. 9A
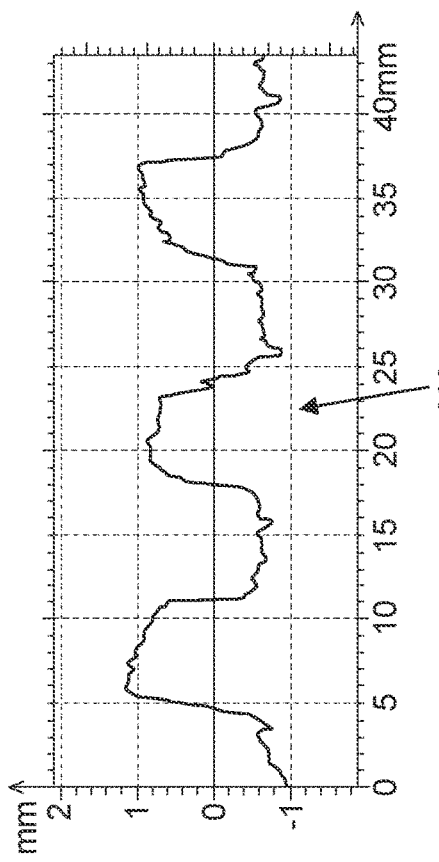
FIG. 9B
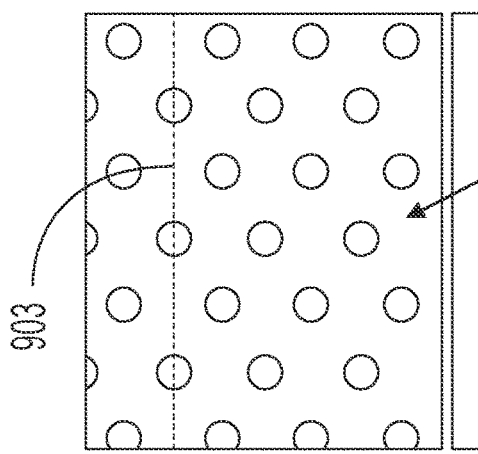
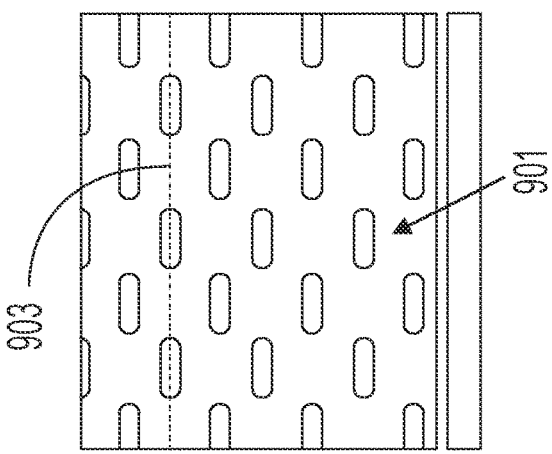

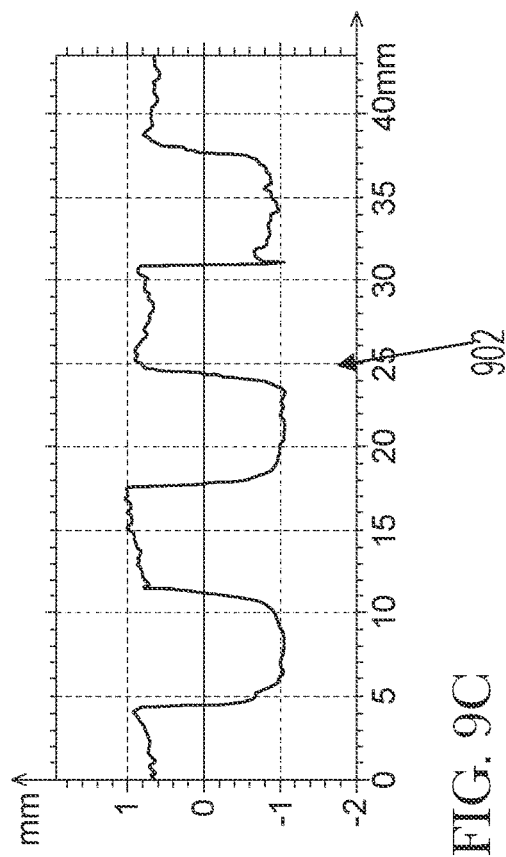
FIG. 9C
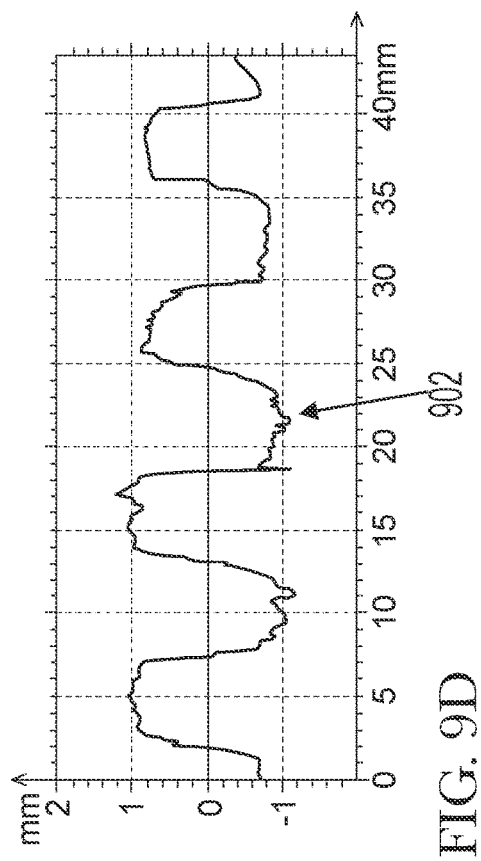
FIG. 9D
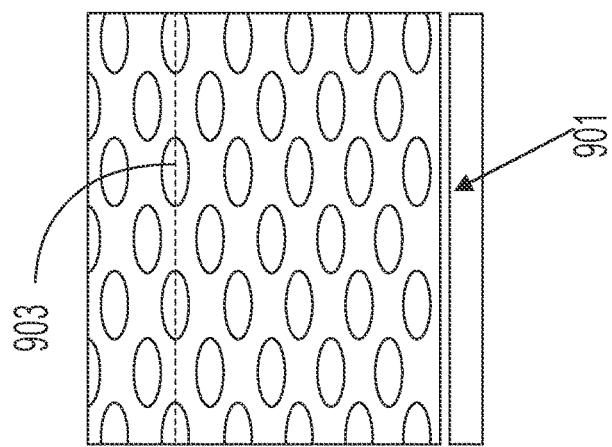
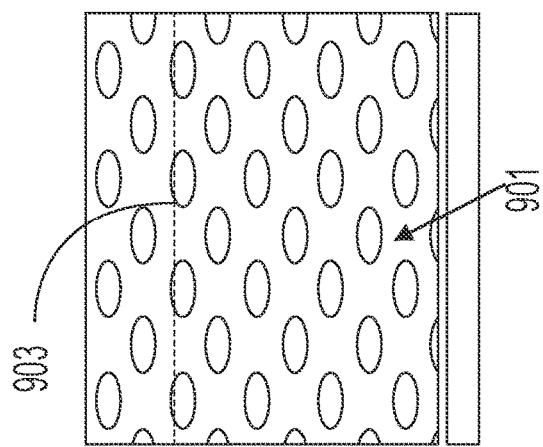

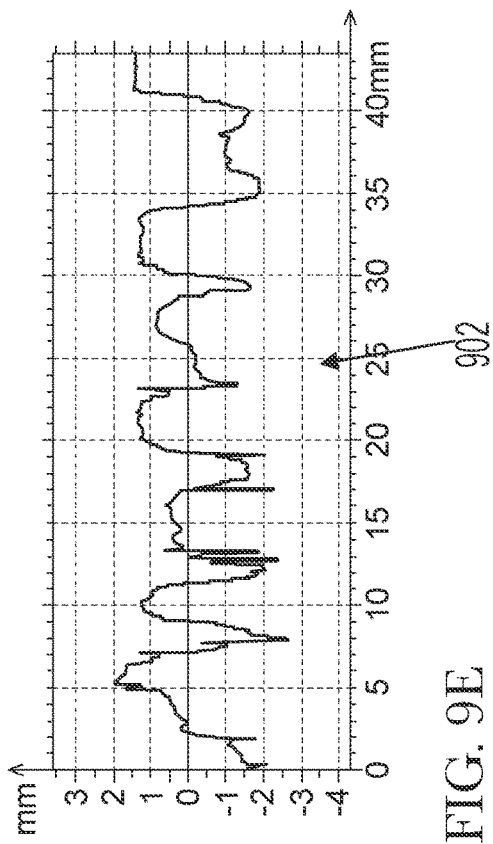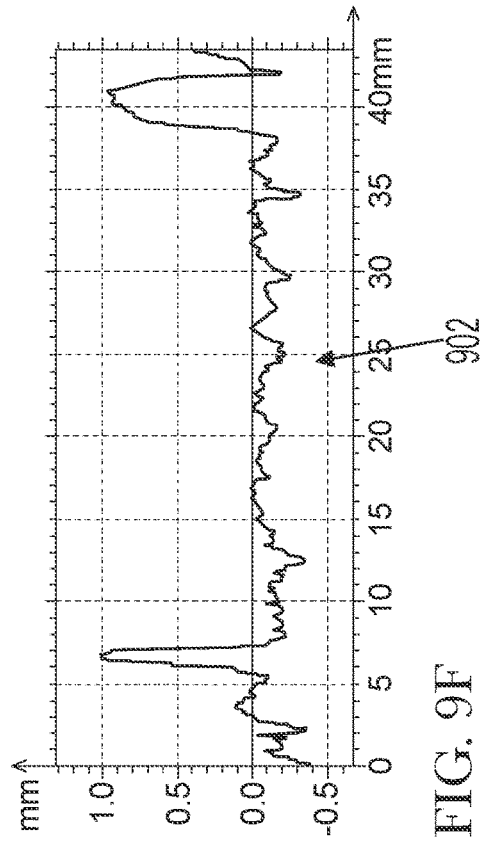
FIG. 9E
FIG. 9F
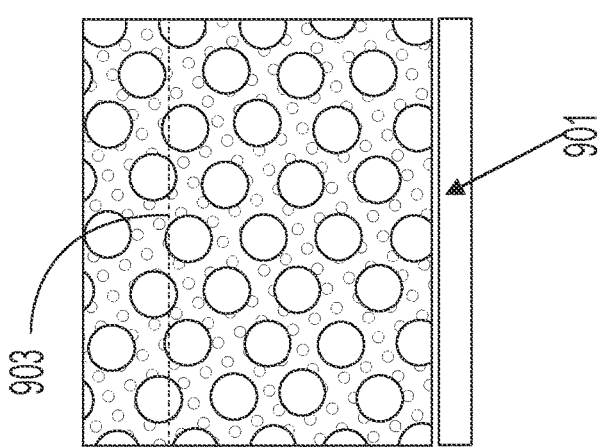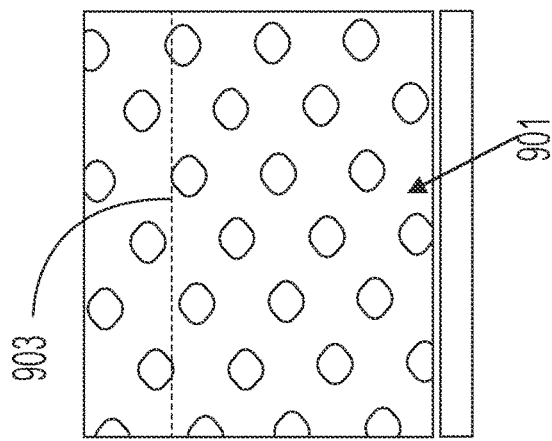

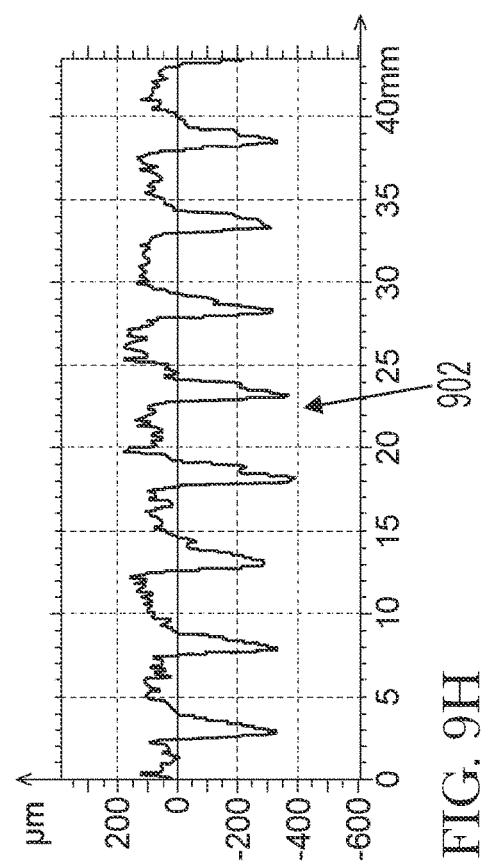
FIG. 9G
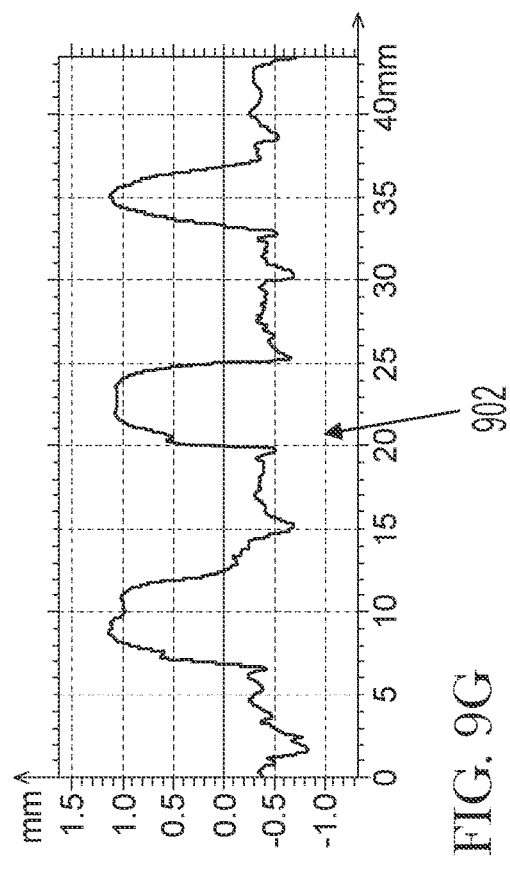
FIG. 9H
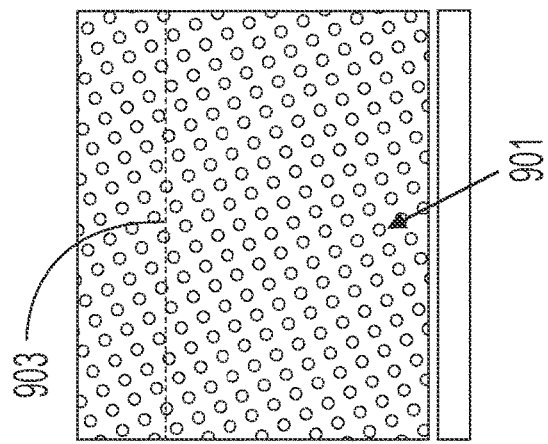
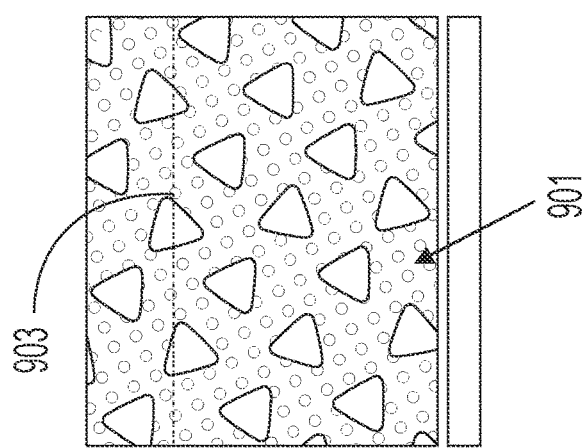

HAIR CLEANING IMPLEMENT

FIELD OF THE INVENTION

The present invention is directed, generally, to a hair cleaning implement. More specifically, the present invention is directed to a dry hair cleaning implement that includes a plurality of protrusion for removing sebum from hair.

BACKGROUND

Personal cleansing cloths, sometimes referred to as "wipes", for removal of sebum, sweat, smell, dirt or the like from skin and hair are well known. Such products generally include a water soluble or insoluble substrate material impregnated with a cleansing composition and, optionally, a conditioning agent. The personal cleansing cloths may be available as either wet or dry cleansing cloths and are commonly formed from natural or synthetic fibers (e.g., cellulose or polyolefin fibers). Wet cleansing cloths are packaged to maintain the cloths in a pre-moistened form for use. Dry cleansing cloths typically require a user to wet the cloth with water, manipulate the cloth to generate lather, and then wipe the cloth against the hair. While these conventional cleansing cloths have proven useful, there remains a need to improve the ability of a cleansing wipe to clean hair.

Previous attempts to improve the performance of cleansing wipes include incorporating raised areas on the substrate in the form of small discrete dots formed by polymeric or plastic-type materials. For example, U.S. Publication No. 2007/0283516, filed by Rasmussen, et al., (the '516 publication) discloses a disposable, nonwoven implement that can be placed on a user's hand (e.g., mitt or glove) and used to clean a companion animal. The '516 publication discloses an implement formed as a laminate of two nonwoven sheets, wherein at least one of the nonwoven sheets includes raised elements that promote removal of loose animal hair and can remove debris such as dirt and dead skin, by physical entanglement with the loose hair and debris. The '516 publication discloses that the raised elements may be of any shape and have a sufficient diameter to provide massaging, cleansing, and/or treating properties. However, cleansing cloths such as the ones disclosed in the '516 publication have not been well-received by some consumers who find them unsuitable for cleaning human hair. Thus, there is a need for a personal cleansing cloth that provides a suitable hair cleaning benefit.

U.S. Pat. No. 9,974,424, issued to the Procter & Gamble Company ('424 patent), discloses a laminate cleaning implement for cleaning a variety of hard or soft surfaces. The '424 patent discloses that the laminate comprises 3 layers, with an active-containing substrate sandwiched between two nonwoven layers. The active-containing layer provides an additive intended to treat a target surface (e.g., a hard surface cleaning agent or skin cleansing agent). Thus, the active is intended to be dispersible, for example, when exposed to water. However, the cleaning implement of the '424 is not configured to be used as a dry hair cleaning implement.

U.S. Pat. Nos. 10,045,888, 10,045,889, and 10,182,949, issued to the Procter & Gamble Co. (the "P&G patents"), disclose a nonwoven laminate with three-dimensional deformations that form protrusions. The P&G patents disclose a need to improve the "tufted" nonwoven articles, like the ones disclosed in the '424 patent. According to the P&G patents, the tufts in the prior art articles are susceptible to the compressive forces associated with manufacture, storage, and shipping of absorbent articles. Thus, the P&G patents disclose that it would be desirable to form three-dimensional features in a non-woven absorbent that remain well defined during high speed manufacturing processes and resist the compressive forces associated with packaging. While the three-dimensional features disclosed in the P&G patents may be suitable for use in a diaper or sanitary napkin, such nonwoven materials may not be suitable for cleaning human hair, which require even more resilient tufts.

Accordingly, it would be desirable to provide a disposable nonwoven implement with raised elements that improve the ability of the implement to clean human hair.

SUMMARY

The present disclosure is directed to a hair cleaning implement, comprising: a first nonwoven material layer comprising a first surface, an opposing second surface, and a plurality of fibers; a film material layer comprising a first surface and an opposing second surface, wherein at least a portion of the first surface of the film material is joined to at least a portion of the second surface of the first nonwoven material layer to form a laminate; and a plurality of discrete protrusions extending outwardly from the first surface of the nonwoven material, wherein the first nonwoven material has a Smean of greater than 0, a Spd of less than about 0.17, and a Vvv of less than about 0.03, according to ISO 25178.

BRIEF DESCRIPTION OF THE DRAWINGS

FIGS. 9A-9H illustrate the surface characteristics of a hair cleaning implement comprising a plurality of discrete protrusions.

DETAILED DESCRIPTION

Figure 1:
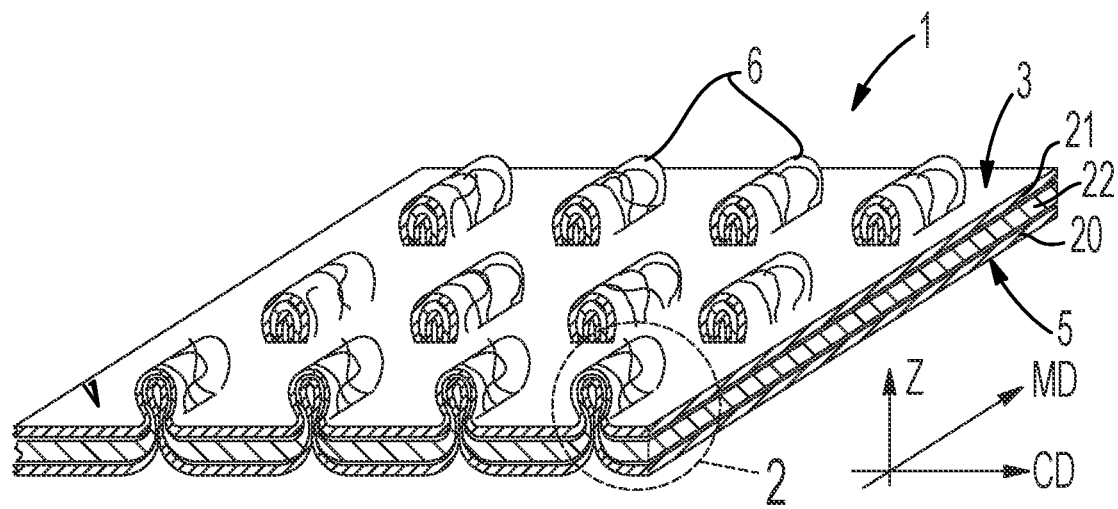
FIG. 1 is an illustration of a tufted cleaning implement from the prior art.

The drawbacks associated with conventional cleansing wipes are well known. Surprisingly, it has now been found that certain nonwoven/film laminate materials can be tailored to include surface protrusions that have a particular geometry which improves the ability of the wipe to remove sebum from human hair. The improved sebum removing ability of the wipe enables a user to clean greasy hair without the need for a hair cleaning composition, and the geometry of the protrusions improves the consumer's perception of the hair cleaning ability of the wipe.

Reference within the specification to "embodiment(s)" or the like means that a particular material, feature, structure and/or characteristic described in connection with the embodiment is included in at least one embodiment, optionally a number of embodiments, but it does not mean that all embodiments incorporate the material, feature, structure, and/or characteristic described. Furthermore, materials, features, structures and/or characteristics may be combined in any suitable manner across different embodiments, and materials, features, structures and/or characteristics may be omitted or substituted from what is described. Thus, embodiments and aspects described herein may comprise or be combinable with elements or components of other embodiments and/or aspects despite not being expressly exemplified in combination, unless otherwise stated or an incompatibility is stated.

In all embodiments, all ingredient percentages are based on the weight of the composition, unless specifically stated otherwise. All ratios are weight ratios, unless specifically stated otherwise. The number of significant digits conveys neither a limitation on the indicated amounts nor on the accuracy of the measurements. All numerical amounts are understood to be modified by the word "about" unless otherwise specifically indicated. Unless otherwise indicated, all measurements are understood to be made at approximately 25° C. and at ambient conditions, where "ambient conditions" means conditions under about 1 atmosphere of pressure and at about 50% relative humidity. All numeric ranges are inclusive and combinable to form narrower ranges not explicitly disclosed. For example, delineated upper and lower range limits are interchangeable to create further ranges.

The compositions of the present invention can comprise, consist essentially of, or consist of, the essential components as well as optional ingredients described herein. As used herein, "consisting essentially of" means that the composition or component may only include additional ingredients that do not materially alter the basic and novel characteristics of the claimed device, composition, or method. As used in the description and the appended claims, the singular forms "a", "an", and "the" are intended to include the plural forms as well, unless the context clearly indicates otherwise.

Definitions

"About" modifies a particular value by referring to a range equal to plus or minus twenty percent (+/−20%) or less (e.g., less than or equal to 15%, 10%, or 5%) of the stated value.

"Discrete" means distinct or unconnected.

"Integral", as used herein as in "integral extension" when used to describe the protrusions, refers to fibers of the protrusions having originated from the fibers of the precursor web(s). Thus, as used herein, "integral" is to be distinguished from fibers introduced to or added to a separate precursor web for the purpose of making the protrusions.

"Joined to" and variations thereof encompasses configurations in which an element is directly secured to another element by affixing the element directly to the other element; configurations in which the element is indirectly secured to the other element by affixing the element to intermediate member(s) which in turn are affixed to the other element; and configurations in which one element is integral with another element, i.e., one element is essentially part of the other element. Elements can be joined to one another using any known manner in which elements can be secured including, but not limited to mechanical entanglement.

"Macroscopic" refers to structural features or elements that are readily visible and distinctly discernable to a human having 20/20 vision when the perpendicular distance between the viewer's eye and the web is about 12 inches (30 cm). Conversely, "microscopic" refers to such features that are not readily visible and distinctly discernable under such conditions.

"Mechanically deforming" refers to processes in which a mechanical force is exerted upon a material in order to permanently deform the material.

"Permanently deformed" refers to the state of a deformable material whose shape or density has been permanently altered in response to applied stresses or strains.

"SELF" is an acronym for Structural Elastic Like Film and refers to refer to the Procter & Gamble technology originally developed for deforming polymer film to have beneficial structural as described and illustrated, for example, in U.S. Pat. Nos. 5,518,801; 5,691,035; 5,723,087; 5,891,544; 5,916,663; 6,027,483; and 7,527,615.

"Web" is used herein to refer to a material whose primary dimension is X-Y, i.e., along its length (or longitudinal direction) and width (or transverse direction). It should be understood that the term "web" is not necessarily limited to single layers or sheets of material, and can, for example, be a laminate and/or a combination of several sheets of materials.

"Z-dimension" refers to the dimension orthogonal to the length and width of a web or article. The Z-dimension usually corresponds to the thickness of the web or material. "X-Y dimension" refers to the plane orthogonal to the thickness of the web or material and usually corresponds to the length and width, respectively, of the web or material.

Hair Cleaning Implement

The hair cleaning implement disclosed herein ("implement") is suitable for removing sebum and other contaminants from human hair. The implement includes a laminate formed by joining a nonwoven material layer to a film material layer. The nonwoven material may be joined to the laminate using any suitable attachment means known in the art (e.g., adhesive bonding, thermal bonding, ultrasonic bonding, and mechanical bonding). In some instances, it may be desirable to join the nonwoven material layer to the film material layer with a hot melt adhesive applied to one or both material layers in a spiral pattern. Of course, it is to be appreciated that embodiments wherein the implement includes more than 1 laminate (e.g., 2, 3, 4, 5, 6, 7, 8, 9, or 10) and/or a laminate that include more than one nonwoven and/or film layers (e.g., 1, 2, 3, 4, 5, 6, 7, 8, 9, or 10) are also contemplated herein.

Unlike pet grooming wipes and other conventional cleansing wipes known in the art, the hair cleaning implement herein may be used with or without a hair cleaning composition. Thus, the implement is generally provided in a form that is free of a hair care composition (e.g., shampoo or conditioner), although embodiments wherein the implement is impregnated with a hair care composition and/or other composition (e.g., fragrance, perfume, hair styling composition, hair colorant, anti-dandruff agent, powders, and/or hair/scalp disinfectant) are contemplated herein.

The hair cleaning implement herein includes a plurality of discrete, integral protrusions configured to provide the implement with specific surface characteristics that improve its ability to remove sebum from human hair. The protrusions may be substantially uniform on the surface of the implement or they may vary in the MD or CD (e.g., by shape or direction of activation). The protrusions extend outwardly away from the surface of the nonwoven material layer of the laminate and may have a "bulbous" or "mushroom-like" appearance. The shape and spacing of the discrete protrusions provide the implement with surface characteristics that exhibit superior sebum removal, as compared to conventional cleansing wipes. Additionally, the nonwoven and film materials selected for use in the laminate of the implement help ensure that the protrusions have suitable physical properties (e.g., rigidity and feel) for providing superior cleaning ability and improved consumer preference. These and other features of the implement are described in more detail below.

In some instances, the hair cleaning implement herein may be configured to be worn by a user (e.g., as a mitt, a glove, or a cap) or placed over a hair cleaning device such as a brush or comb as a cover or an attachment. For example, a second nonwoven material layer may be joined to the laminate to form a pouch that is configured to receive a hand, finger, brush, comb, or other hair care device. In this example, two nonwoven layers may be joined to the film layer such that the pouch is formed between the two nonwoven layers, thereby providing a better feel on the user's hand than a film layer. In another example, the laminate may include a strap or loop of material that can be placed over the hand or finger(s) of a user or a hair cleaning device to conveniently hold the implement in place during use. Some nonlimiting examples of various configurations for the implement herein, including wearable configurations, and method of making the same are described in U.S. Pat. Nos. 9,994,424 and 10,391,041; U.S. Publication Nos. 20050229349 and 20070283516; Canadian patent No. 2,480,748; and European Publication No. EP2,777,770.

To provide a hair cleaning benefit, the hair contacting surface of the implement (i.e., the nonwoven surface with the protrusions) is contacted with the scalp and/or the roots of one or more hair strands (e.g., 10 or more hair strands). While maintaining contact with the hair strands, the implement is moved from the roots to the tips of the hair strands. This process may be repeated for all the hair as often as desired (e.g., 1-12 times for each bundle of hair strands).

Nonwoven Material Layer

The hair cleaning implement herein includes a nonwoven material layer comprising one or more layers of nonwoven fibers. A layer of nonwoven fibers is sometimes referred to as a nonwoven web. As used herein, the term "nonwoven" refers to material having a structure of individual fibers which are interlaid, but not in a repeating pattern as in a woven or knitted fabric.

Common methods of making nonwoven webs include spunbonding and meltblowing techniques, for example, as described in U.S. Pat. Nos. 4,041,203; 4,374,888, 5,843,057, and 5,885,909. If the nonwoven material layer is a composite nonwoven material (i.e., includes multiple nonwoven webs joined together), the individual webs may be the same or different types of nonwoven materials. For example, the nonwoven material layer may be a composite nonwoven material comprising a meltblown fiber layer sandwiched between two spunbond fiber layer, sometimes referred to as an "SMS" configuration. Alternatively, the nonwoven material layer may be a single layer of spunbond or meltblown nonwoven fibers. The nonwoven material layer herein should have sufficient basis weight and density for use in a hair cleaning implement. Thus, the nonwoven material layer herein may have a basis weight of between 8 and 100 grams/cm$^2$ and a density of between 0.01 and 0.4 g/cm$^3$ at 2 kPa.

The fibers used to form the nonwoven material layer of the laminate herein are selected to remove sebum from human hair. It has been surprisingly discovered that bicomponent, trilobal polyolefin fiber in a core/sheath configuration provide better sebum removal than other fiber types (e.g., round or triangular mono-component fibers). In a particularly suitable example, the fibers are 50/50 wt % polypropylene core/polyethylene sheath trilobal fiber. It is believed, without being limited by theory, that the polypropylene core helps provide the fiber and the protrusions with suitable strength and rigidity for use in cleaning human hair, and the polyethylene sheath provides the user with a softer, more desirable feel during use. In some instances, the nonwoven layer may also include natural fibers such as cellulose or kapok fibers.

While trilobal fibers are generally preferred for use herein, it is to be appreciated that embodiments wherein the nonwoven material layer of the implement includes other fibers shapes (e.g., round, triangular, clover, or star) are also contemplated. While it may be less preferred, in some instances, the fibers may be round or triangular, as long as the protrusions disposed on the surface of the non-woven material layer of the implement are configured to provide the desired level of sebum removal. The nonwoven fibers used in the implement herein generally have a major cross-sectional dimension ranging from 1-500 microns. In some instances, fiber size may be expressed in denier, which is a unit of weight per length of fiber. Thus, the fibers herein may, for example, range from about 1 denier to about 100 denier.

Film Material Layer

The hair cleaning implement herein includes a film material layer joined to the nonwoven layer described above. Unlike the nonwoven laminates used in some conventional cleansing cloths, the film material in the present implement helps provide the protrusions with suitable rigidity and resistance to deformation. The film material layer may include a single film layer or two or more film layers joined together, for example, via adhesive or thermal bonding, to form a composite structure. The film material layer may be liquid and/or vapor impermeable. In some instances, the film may be breathable (i.e., allows the passage of air and water vapor), but prevents the passage of sebum. In some instances, it may be desirable to use a film material that has a relatively high coefficient of friction on human skin. In this way, the film material may resist sliding across a user's hand, which may improve the handling of the hair cleaning implement during use. The film material(s) used in the film material layer may be a plastically and/or elastically extensible polymer film. Some nonlimiting examples of materials that may be suitable for making films include polypropylene, polyethylene, polyester, styrene-isoprene-styrene, styrene-butadiene-styrene, and combinations thereof.

Protrusions

The hair cleaning implement herein includes a plurality of discrete protrusions that are configured to remove sebum from human hair. The protrusions extend outwardly away from the surface of the nonwoven material layer of the laminate and may have a generally bulbous or mushroom-like appearance. The protrusions can be formed by mechanically deforming the laminate by using any suitable method known in the art. For example, the laminate may be subjected to mechanical deformation in one or more directions (e.g., unidirectional or bidirectional) by placing the laminate between a pair of forming members. The forming members can be plates, rolls, belts, or any other suitable types of forming members. A particularly suitable method of making the protrusions is disclosed in U.S. Pat. No. 10,045,888. As a result of the mechanical deformation process, the side of the laminate opposite the protrusion (i.e., the film material layer side) may include an opening, although not in the form of an aperture or through-hole. It is to be appreciated that the method of mechanically deforming the laminate material may exclude (or be distinguishable from): hydroforming (hydroentangling); hydromolding; use of air jets; rigid-to-resilient (e.g., steel/rubber) embossing; and the use of a patterned surface against a flat anvil surface (e.g., rigid-to-rigid embossing). The method may also exclude (or be distinguishable from) SELFing processes to form corrugated structures (and tufted structures) in that the SELF teeth typically have a comparatively small diameter tip, and the ridges of the mating ring roll only border the SELF teeth on the sides, and not the front and back of the teeth.

It has now been discovered that configuring the protrusions to provide the nonwoven material layer with specific surface characteristics may improve the ability of the hair cleaning implement to remove sebum from human hair. Accordingly, the surface of the hair cleaning implement comprising the protrusions has a Smean of greater than 0, but typically less than 0.01. (e.g., between 0.001 and 0.01 or between 0.001 and about 0.007). Smean is the average, in absolute heights, of all the points making up the surface. The surface of the hair cleaning implement comprising the protrusions has a Spd value of less than 0.17 (e.g., less than 0.1 or between 0.03 and 0.1). Spd is the density of peaks (i.e., number of peaks per unit area) on the surface of the material. The surface of the hair cleaning implement comprising the protrusions further has a Vvv of less than 0.03 (e.g., less than 0.025 or between 0.019 and 0.025). Vvv is the "Dale Void Volume" or the volume of space bounded by the surface texture from a plane at a height corresponding to a material ratio (mr) level, "p" to the lowest valley. The Smean, Spd, and Vvv can all be determined according to International Standard 25178 (ISO 25178), published by the International Organization for Standardization, using a Dematop model #02.00.01.102 or equivalent, with AEVA.2 3D analysis software installed, available from Eotech, France. The foregoing surface texture parameters, along with other Areal surface texture parameters, are described in R. Leach (ed.), *Characterisation of Areal Surface Texture*, DOI: 10.1007/978-3-642-36458-7_2, Springer-Verlag Berlin Heidelberg 2013.

Figure 2:
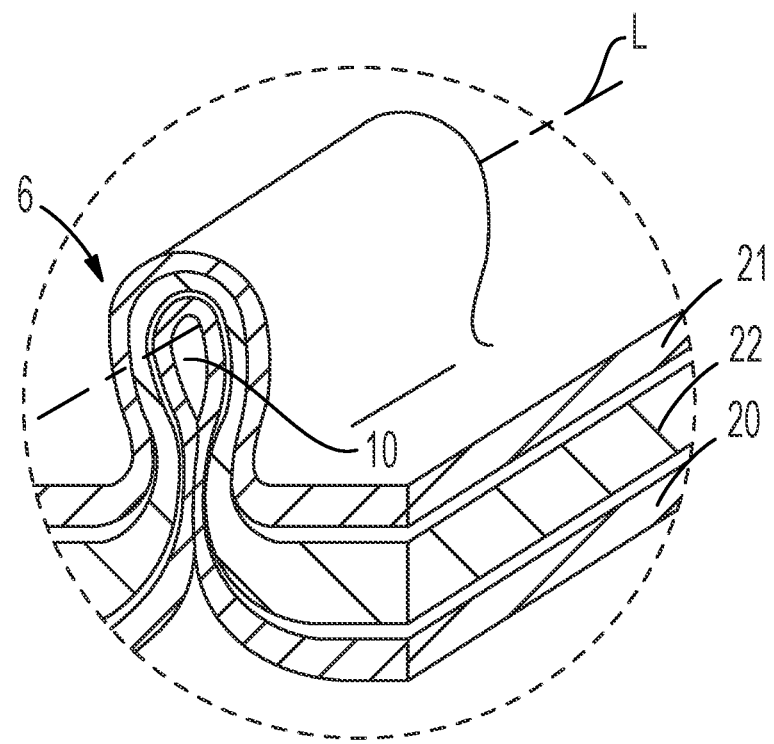
FIG. 2 is a magnified view of tuft of the prior art cleaning implement.

FIG. 1 shows an example of a tufted laminate web 1 known in the art. The web 1 has a first side 3, a second side 5, a machine direction (MD) and, a cross machine direction (CD) as is commonly known in the art of web manufacture. The web 1 is in the form of a laminate comprising a first non-woven layer 21, a second non-woven layer 20, and a film layer 22 disposed therebetween. The surface of the first non-woven layer includes tufts 6 formed using a SELFing technique. A representative tuft 6 for web 1 shown in FIG. 1 is shown in a further enlarged view in FIG. 2. The tufts 6 comprises a plurality of looped fibers that are substantially aligned such that tuft 6 has a distinct linear orientation and a longitudinal axis L. In the example shown in FIGS. 1 and 2, longitudinal axis L is parallel to the MD. A characteristic of tufts 6 is their generally open structure characterized by open void area 10 defined interiorly of tuft 6, as shown in FIG. 2. In other words, the two longitudinal ends of tuft 6 are generally open and free of fibers, such that tuft 6 forms something like a "tunnel" structure, as shown in FIG. 2.

Figure 3:
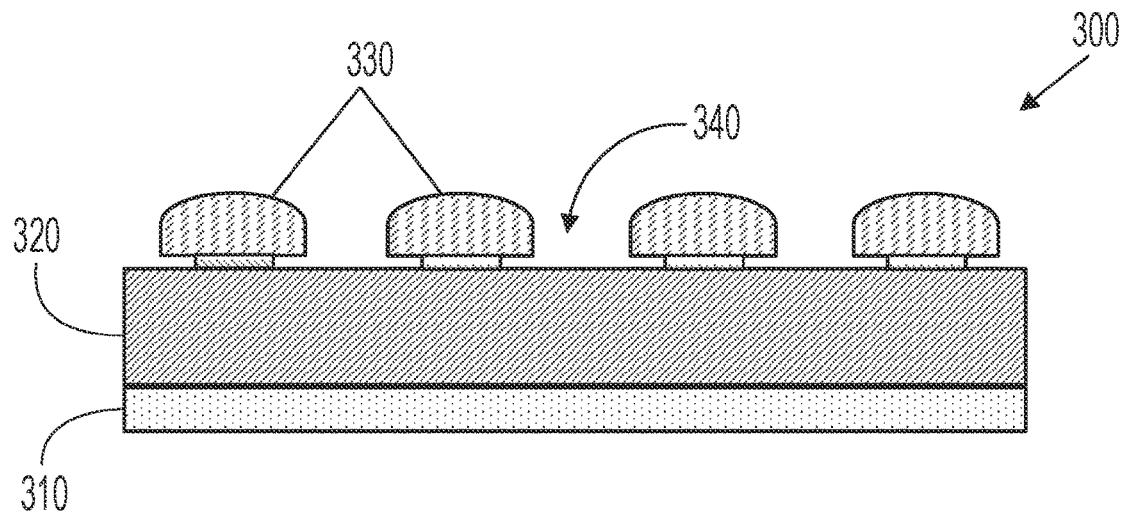
FIG. 3 illustrates an example of a hair cleaning implement.

FIG. 3 illustrates an example of a hair cleaning implement 300 in the form of a two-layer laminate. The implement 300 includes a film layer 310 and a non-woven layer 320. As illustrated in FIG. 3, protrusions 330 extend outwardly away from the hair facing surface 340 of the nonwoven layer 320.

Figure 4:
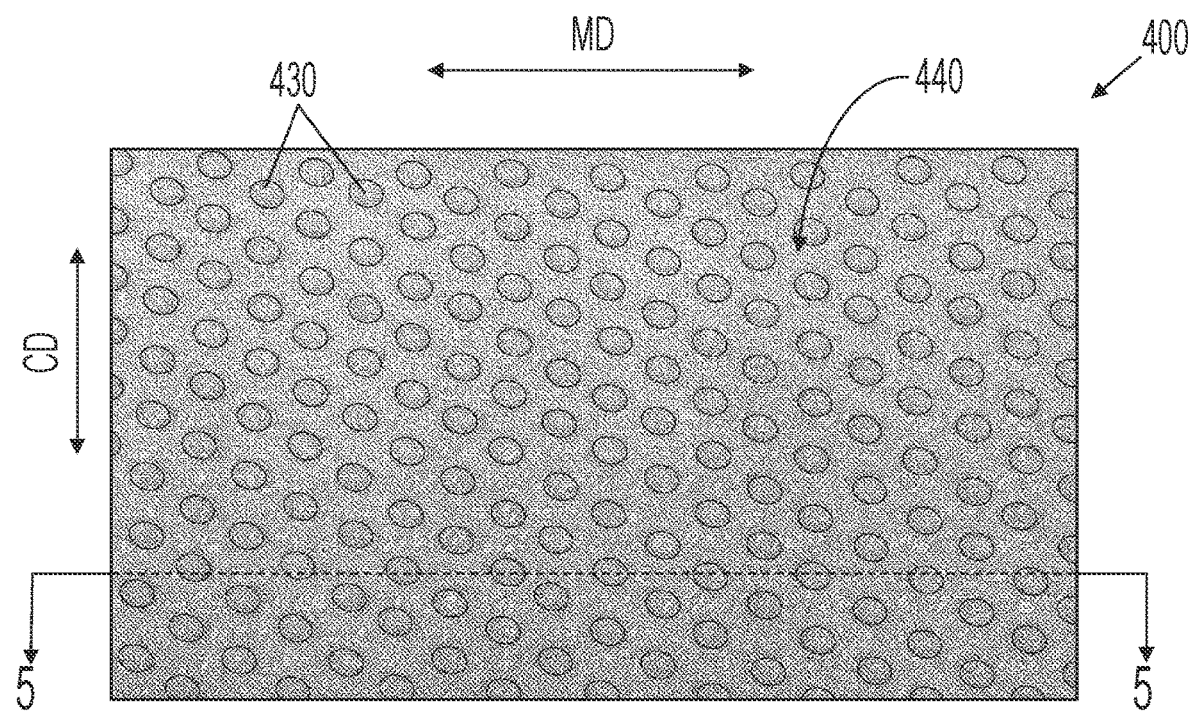
FIG. 4 is a plan view of a hair cleaning implement.

FIG. 4 shows a plan-view of an exemplary laminate 400. As can be seen in FIG. 4, the implement 400 includes a plurality of discrete protrusions 430 on the nonwoven surface 440 of the implement 400. In this example, the nonwoven surface 440 of the laminate 400 is intended to be contacted with the hair of a user (i.e., the hair-facing side). The protrusions 430 shown in FIG. 5 have a width that varies from one end of the protrusion 430 to the opposing end. The width of the protrusions 430 may vary such that the widest portion of the protrusion 430 is in the middle of the protrusion 430, with the width decreasing at one or both ends of the protrusion 430. In other cases, the protrusions 430 may be wider at one or both ends than in the middle. In still other cases, the protrusions 430 may be formed to have substantially the same width from one end of the protrusion 430 to the other end. If the width of a protrusion 430 varies along its length, the portion of the protrusion 430 where the width is the greatest is used in determining an aspect ratio of the protrusions 430. In the implement 400 shown in the FIG. 5, the protrusions 430 are generally oval-shaped and the length of the protrusions 430 generally corresponds to the machine direction (MD) of the implement 400, but it is to be appreciated that the protrusion 430 may have any shape and/or be oriented in any direction, as desired. For example, the shape of the protrusions 430 can be selected from circular, triangular, rectangular, square, diamond, rounded diamond, clover, heart, teardrop, etc.

Figure 5:
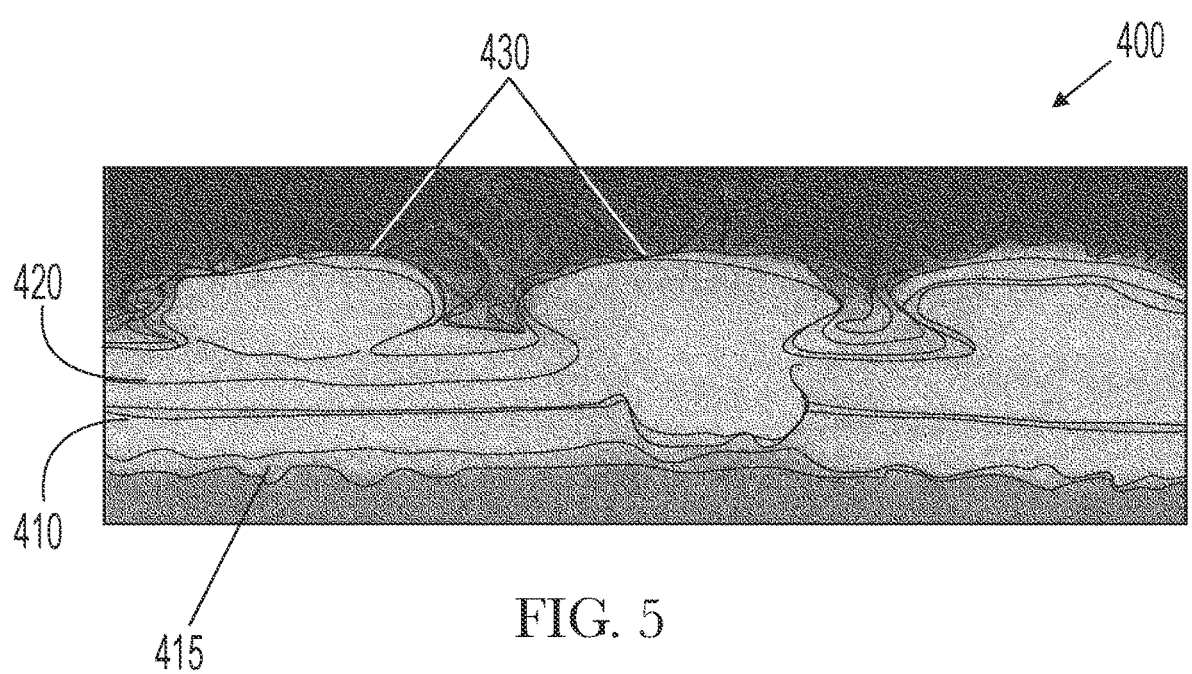
FIG. 5 is cross-section view of a hair cleaning implement.

FIG. 5 is a cross-section view of the implement 400 of FIG. 4 along line 5-5. The implement 400 shown in FIG. 5 is in the form of a three-layer laminate. As can be seen in FIG. 5, the implement 400 includes a film layer 410 sandwiched between a first nonwoven layer 420 and a second nonwoven layer 415.

Figure 6:
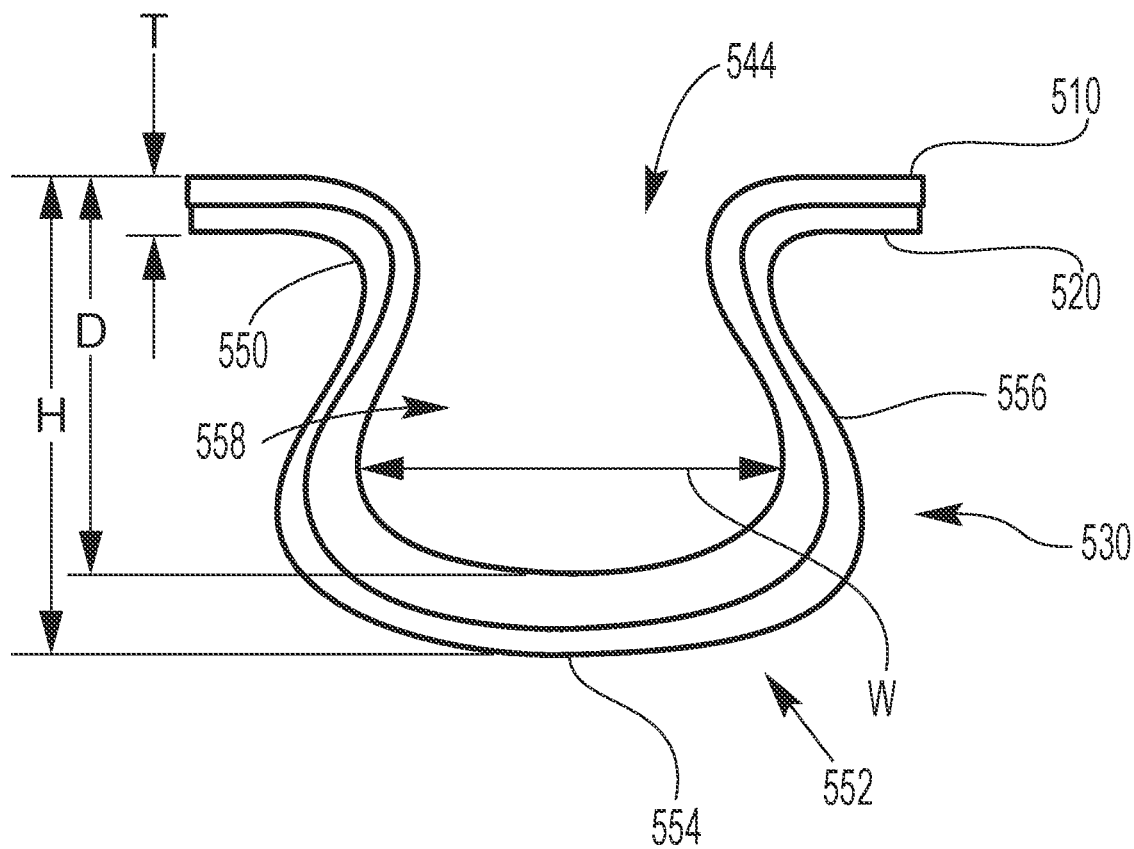
FIG. 6 illustrates an example of a protrusion.

FIG. 6 illustrates a longitudinal (i.e., z-direction) cross-section of a protrusion 530 as described herein. The protrusion 530 illustrated in FIG. 6 is formed from a two-layer laminate that includes an inner film layer 510 and an outer nonwoven layer 520. As shown in FIG. 6, the protrusion 530 has a base 550 that defines an opening 544, a cap portion 552 that extends to a distal end 554, side walls (or "sides") 556, and an interior portion 558 defined by the base 550, side walls 556 and cap 552. The base 550 of the protrusion 530 is typically the narrowest portion of the protrusion 530 when viewed from one of the ends of the protrusion 530. The term "cap" is not intended to imply any particular shape, other than it comprises the wider portion of the protrusion 530, which includes and is adjacent to the distal end 554 of the protrusion 530. As shown in FIG. 6, the cap 552 has a maximum interior width W between the inside surfaces of the opposing side walls 556. The protrusion 530 has a depth D measured from the surface of the film layer 510 to the interior of the protrusion 530 at the distal end 554. The protrusion 530 has a height H measured from the surface of the film layer 510 to the distal end 554 of the protrusion 530. In most cases the height H of the protrusions 530 will be greater than the thickness T of the laminate material.

Figure 7A:
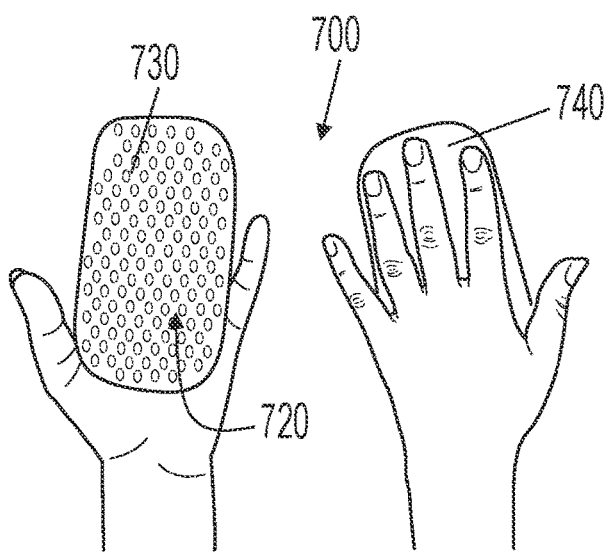
FIGS. 7A-7E illustrate various examples of wearable implements.
Figure 7B:
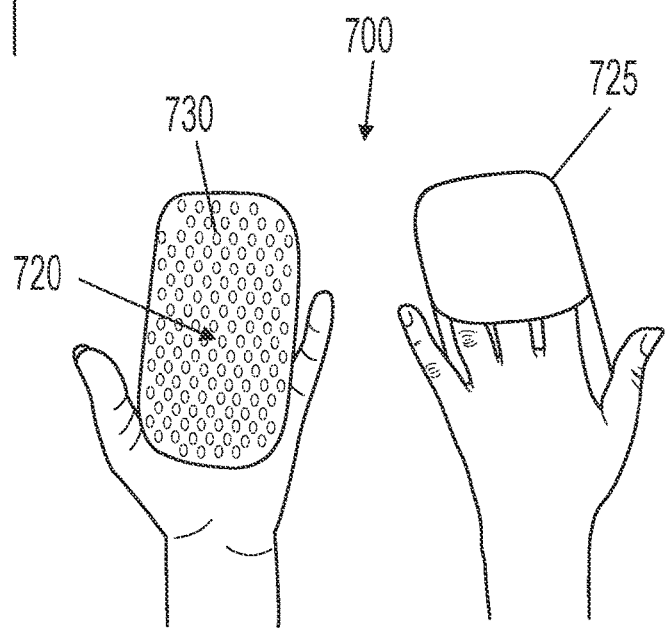
Figure 7C:
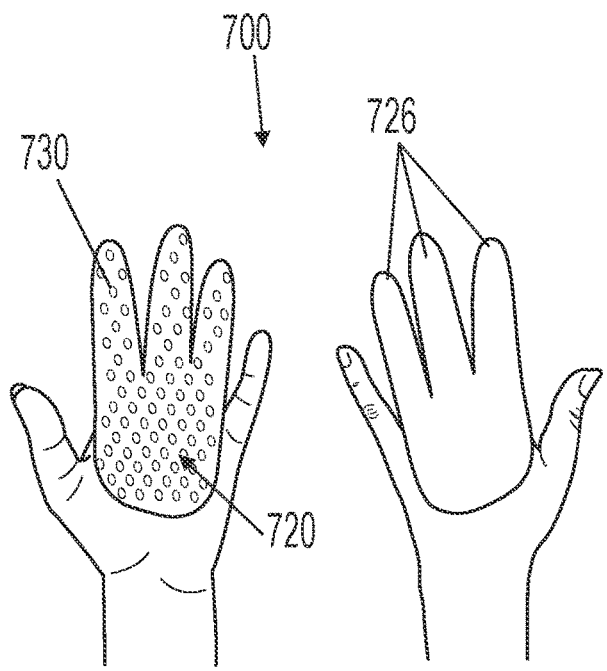
Figure 7D:
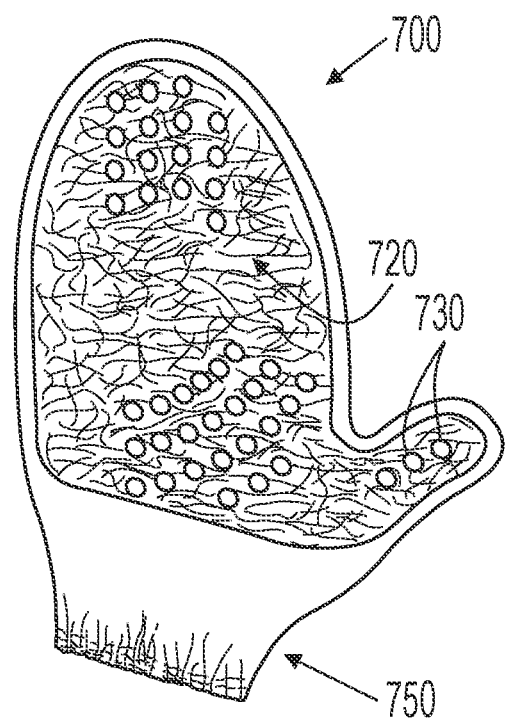
Figure 7E:
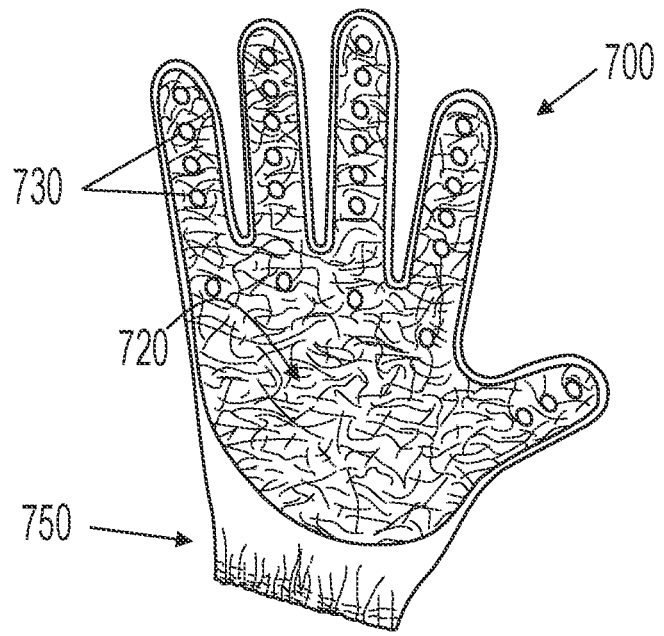

FIGS. 7A, 7B, 7B, 7C, 7D, and 7E illustrate examples of a wearable implement 700. Each of the wearable implements 700 includes a nonwoven portion 720 comprising a plurality of discrete protrusions 730. In FIG. 7A, the wearable implement 700 is in the form of a flat wipe. The back side or hand-facing side 740 of the wipe may be configured to provide a suitable gripping surface for the user. The wearable implement 700 illustrated in FIG. 7B includes a pouch 725 configured to receive one or more fingers of the user. The wearable implement illustrated in FIG. 7C includes 3 finger openings 726 configured to receive the index finger, middle finger, and ring finger of a user. In FIG. 7D, the wearable implement is in the form of a mitt that includes an internal space configured to receive a user's hand. In FIG. 7E, the wearable implement 700 is in the form of a glove. The wearable implement 700 may include a wrist portion 750, as shown in FIGS. 7D and 7E, to help keep the implement securely on the user's hand during use. For example, the wrist portion 750 may include an elastic member or be modified to exhibit elastic-like properties to create a tighter, more secure fit around the wrist of the user.

Kit

While the present hair cleaning implement may be used to clean hair without a hair cleaning composition, it may be desirable to provide the implement to a consumer as part of a hair cleaning kit (e.g., a travel kit for use away from home). The kit may include one or more of the present hair cleaning implements (e.g., 1, 2, 3, 4, 5, 6, 10, 20, 30, or more), a hair cleaning composition, and, optionally, a hair conditioning composition contained in a common package (e.g., as a standalone kit or as part of a larger travel kit). Each product in the kit may be individually packaged and then placed in a common package for sale to a consumer. The hair cleaning and/or conditioning composition included in the kit may be a liquid composition or a dry composition. The composition(s) may be applied to the hair cleaning implement prior to use and/or applied directly to the hair of a user before and/or after using the implement. In some instances, a single composition comprising both hair cleaning and hair conditioning ingredients may be provided. The type of hair cleaning and/or hair conditioning composition suitable for use in the kit are not particularly limited. Some nonlimiting examples of hair cleaning and hair conditioning compositions suitable for use herein are described in U.S. Pat. Nos. 6,649,155, 8,349,300 and 10,391,041; and US Publication Nos. 20130280192, 2008/0292574, 2007/0041929, 2008/0292575 and 20080206355. In some instances, the kit may also include one or more conventional hair grooming devices (brush, comb, hair dryer, etc.) or other items commonly used to clean or style hair.

Sebum Removal Test

Figure 8:
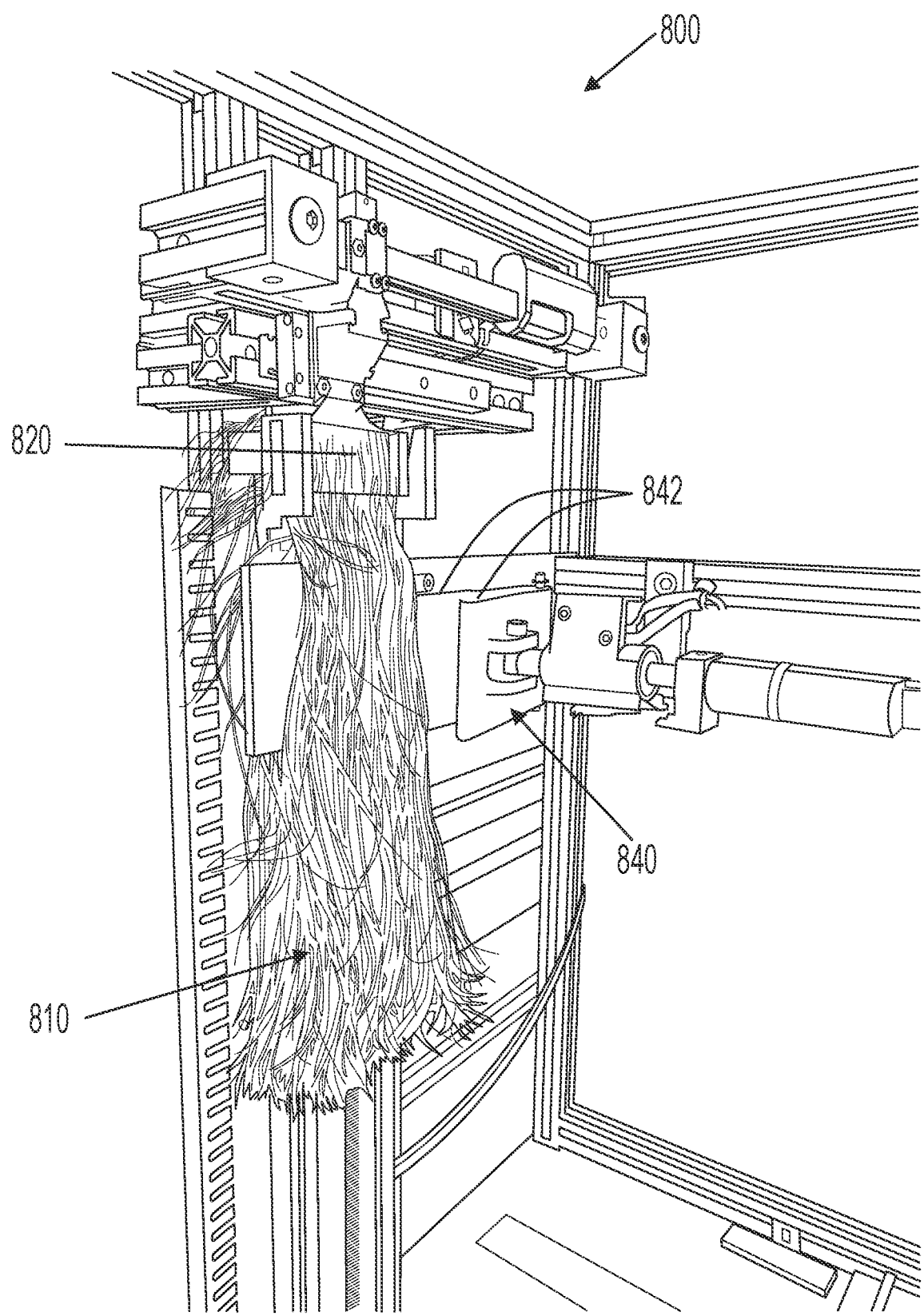
FIG. 8 is a perspective view of a sebum removable device used in the Sebum Removal Test.

This test is used to objectively measure the amount of artificial sebum removed from a hair switch by a substrate using a sebum removal device 800. While the Sebum Removal Test uses the device 800 illustrated in FIG. 8, it is to be appreciated that the method can be performed on an equivalent system, which is within the skill of the ordinary artisan.

The sebum removal device 800 includes a support hanger 820 mechanically coupled to a first micro actuator. The support hanger 820 is configured to hold a hair switch 810 for use in the sebum test. The sebum removal device 800 also includes a hinged substrate holder 840 mechanically coupled to a linear, screw-driven slide 850. The substrate holder 840 includes a pair of hinged jaws 842 that can be open and closed by a second micro actuator. The hair cleaning implement to be tested can be secured to the inner surface of one or both jaws 842 of the substrate holder 840. When the sebum removal device 800 is activated, the first micro actuator moves the hair switch 810 towards the open jaws of the substrate holder 840. Once the hair switch 810 is positioned for testing within the open jaws 842 of the substrate holder 840, a second micro actuator closes the jaws 842 of the substrate holder 840 and maintains the substrate in contact with the hair switch 810 at a constant pressure of about 338 g/cm$^2$ on the hair switch 810. Next, the screw-driven linear slide moves the substrate holder 840 in a downward direction at a speed of 4.24 cm/second until the programmed length of travel is complete. This motion simulates the action of a user wiping their hair with a hair cleaning implement. Once the substrate holder 840 reaches the bottom of its travel cycle, the jaws 842 of the substrate holder 840 are opened and the hair switch 810 is moved back to the starting position. The substrate holder 840 is moved back up to its starting position. The sebum removal device 800 can be programmed to repeat the process as many times as desired.

Method

Prepare a 5% sebum/alcohol solution by mixing sebum (e.g., obtained from Advanced Testing Labs, Cincinnati, Ohio) and isopropyl alcohol in a suitable container. The container should be large enough to submerge a hair switch Immerse a 20 g, 12" New Gen Pop brand flat hair switch, available from International Hair Institute, Chicago, or equivalent in the 5% sebum solution for 30 seconds. Remove the hair switch from the solution and comb out the tangles with a comb. Allow the prepared hair switch to dry at ambient temperature until the isopropyl alcohol has evaporated (e.g., overnight). Weigh the substrate to be tested and record the weight ($W_o$). Place the dry prepared hair switch in the sample hanger and place the substrate in the substrate holder. Activate the testing system and repeat the sequence for a total of 10 cycles. Remove the substrate from the substrate holder and weigh it. Record this weight as final weight ($W_f$). The amount of sebum removed from the hair switch by the substrate is calculated as: $W_f - W_o$.

Example 1

This example demonstrates the ability of the present hair cleaning implement to effectively remove sebum from hair better than conventional wipes. Unless otherwise indicated, the hair cleaning implements tested in this example are three-layer laminates in a "nonwoven-film-nonwoven" configuration. The first non-woven layer, which provides the hair-contacting surface of the hair cleaning implement, is a 50 gsm nonwoven material formed from trilobal PE/PP (sheath/core) bicomponent fibers. The second nonwoven material is a 50 gsm nonwoven material formed from round PE/PP (sheath/core) bicomponent fibers. Sandwiched between the first and second nonwoven layers is a film material layer comprising a multilayer film material (available from Mondi as A2). The layers are joined together using a spray adhesive (3M Super 77).

The protrusions are formed by placing the laminate material between a set of male/female intermeshing plates. Alignment pins are used to ensure that the male and female elements of the plates intermesh properly. The laminate is positioned between the intermeshing plates such that the first nonwoven material layer (i.e., the nonwoven material with the trilobal fibers) faces away from the male elements. Shims can be placed between the plates, (outside of the male and female pattern areas) to control the depth of engagement (DOE) between the male and female elements of the plates. A clicker press (e.g., Manufacturing Supply Company, Model SE 20C or equivalent) can be used to press the press the plates together, thereby forming the protrusions in the laminate. Once the plates have reached the desired DOE, separate the plates and remove the hair cleaning implement for testing.

Eight different hair cleaning implements were tested in this Example. Each implement differed in protrusion pattern and/or depth of engagement. One implement was made without protrusions for use as a negative control (Sample 8). The implements were tested according to the Sebum Removal Test described above. The surface properties of each implement (i.e., Smean, Spd, and Vvv) were determined according to ISO 25178 using a Dermatop model #02.00.01.102 with AEVA.2 3D analysis software installed. A summary of the results is provided in Table 1 below. The surface properties of the implements are illustrated in FIGS. 9A-9H. Each of FIGS. 9A-9H shows a two-dimensional representation 901 of a reconstructed three-dimensional image of the implement tested. The two-dimensional representation is created by the AEVA2 3D analysis software. Each of FIGS. 9A-9H also shows an extracted image 902 that graphically illustrates of the height and depth profile of the implement surface along line 903 of the 2D image 901. The extracted image 902 is provided by MountainMap™ brand imaging software available online from Digital Surface.

Figure 10:
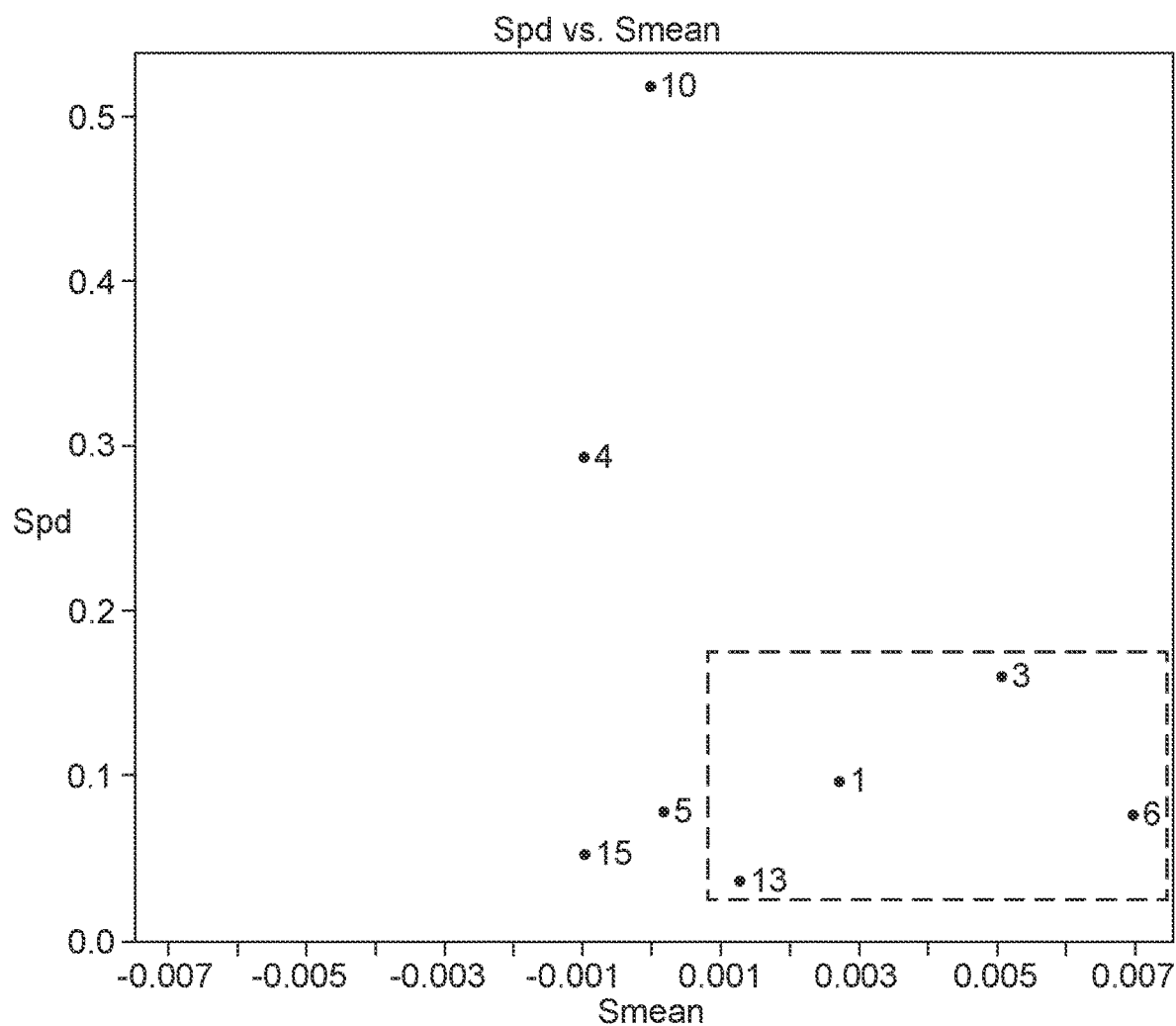
FIG. 10 is a plot of the surface properties of Smean vs. Spd for various hair cleaning implements.
Figure 11:
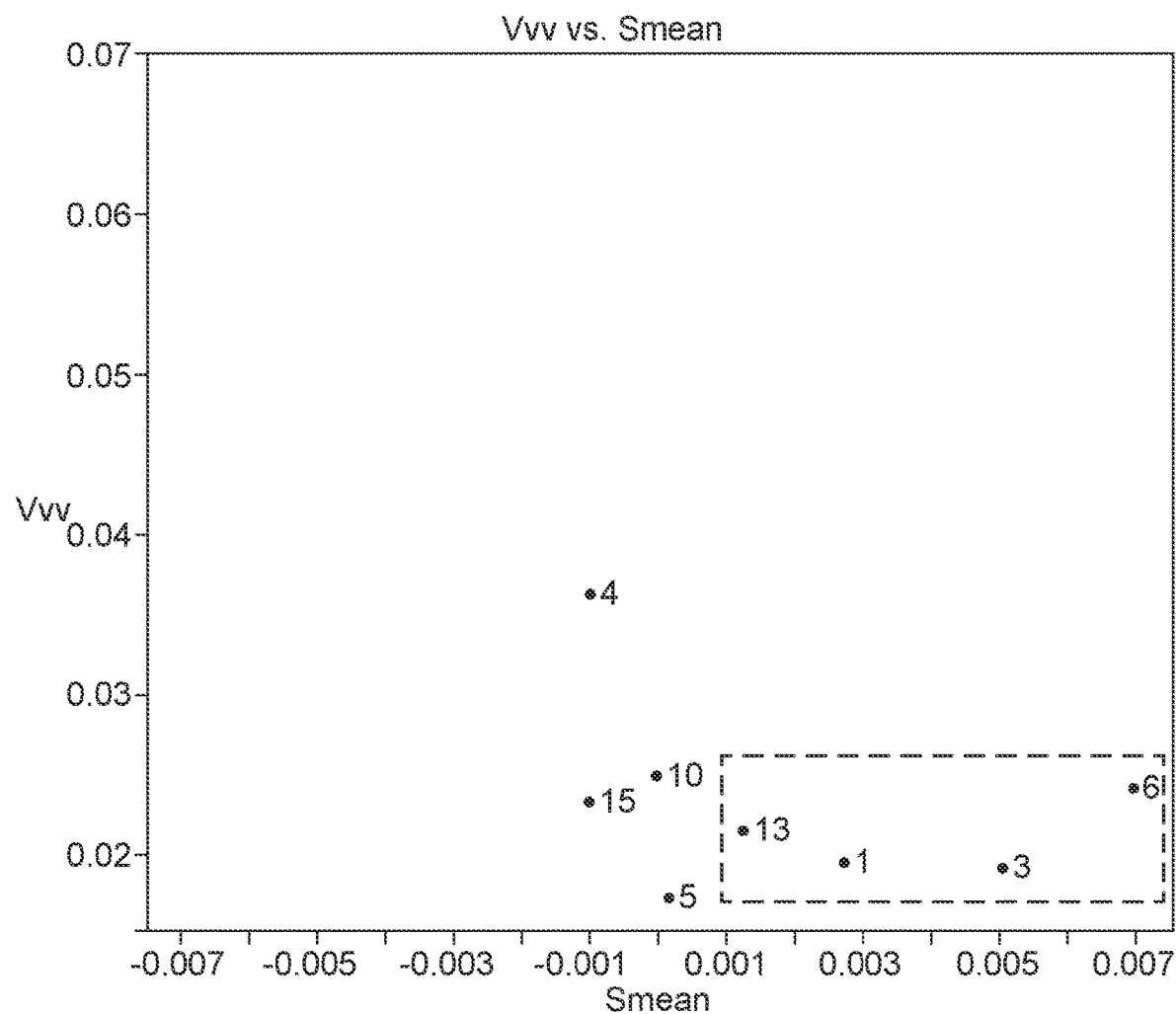
FIG. 11 is a plot of the surface properties of S mean vs. Vvv for various hair cleaning implements.
Figure 12:
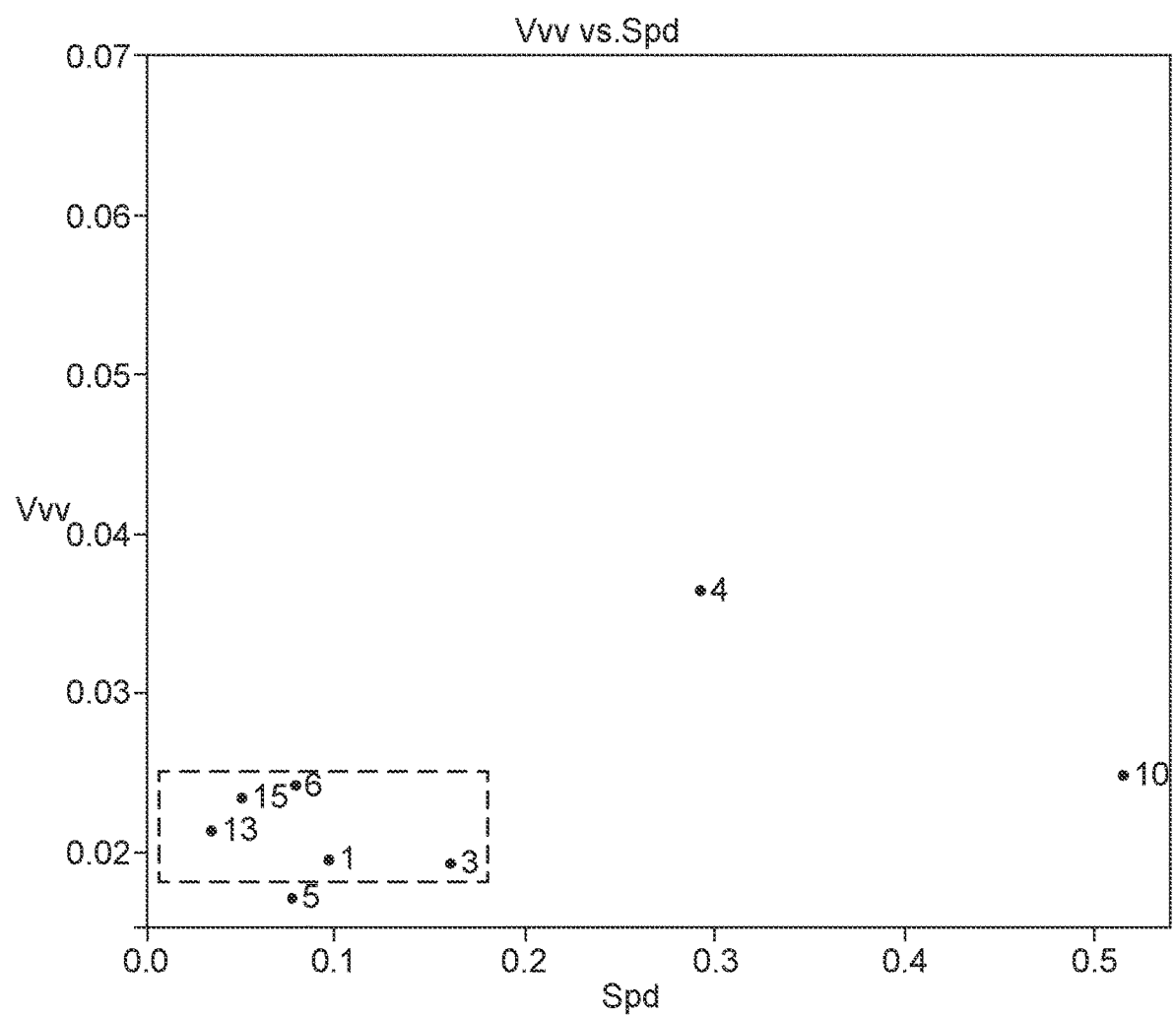
FIG. 12 is a plot of the surface properties of Spd vs. Vvv for various hair cleaning implements.

The hair cleaning implements herein should remove at least 5 mg of sebum to be considered suitable for use by consumers. As can be seen in Table 1 below, only Samples 1, 2, 3 and 4 provided at least 5 mg of sebum removal. A plot of the surface properties of each laminate (Smean, Spd, and Vvv) is provided in FIGS. 10-12. As can be seen in FIGS. 10-12, the boundaries of the broken line box define relatively narrow ranges of surface properties corresponding to Samples 1-4. Thus, these results suggest that protrusion configuration, as characterized by the surface properties of Smean, Spd, and Vvv, is important for providing a hair cleaning implement that is sufficiently able to remove sebum from hair.

As can be seen in Table 2, trilobal fibers generally performed better than the round fibers, the 50/50 fibers generally performed better than the 30/70 or 70/30 fibers, and the 50/50 PE/PP trilobal fibers performed the best.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

TABLE 1

| Sample # | Sample Code | Surface Properties (FIG.) | D.O.E. (cm) | Avg Sebum Removal (g) | Smean | Spd | Vvv |
|---|---|---|---|---|---|---|---|
| 1 | EXP18-EB6227-6B | FIG. 9A | 0.254 | 0.009 | 0.007 | 0.078 | 0.024 |
| 2 | EXP18-EB6227-1B | FIG. 9B | 0.254 | 0.007 | 0.003 | 0.096 | 0.019 |
| 3 | EXP18-EB6227-13B | FIG. 9C | 0.254 | 0.006 | 0.001 | 0.035 | 0.021 |
| 4 | EXP18-EB6227-3B | FIG. 9D | 0.254 | 0.005 | 0.005 | 0.161 | 0.019 |
| 5 | EXP18-EB6227-4B | FIG. 9E | 0.254 | 0.004 | -0.001 | 0.293 | 0.036 |
| 6 | EXP18-EB6227-5B | FIG. 9F | 0.178 | 0.004 | 0.000 | 0.078 | 0.017 |
| 7 | EXP18-EB6227-15B | FIG. 9G | 0.254 | 0.004 | -0.001 | 0.052 | 0.023 |
| 8 | EXP18-EB6227-10B | FIG. 9H | N/A | 0.002 | 0.000 | 0.519 | 0.025 |

Example 2—Impact of Fiber Type on Sebum Removal

Figure 13:
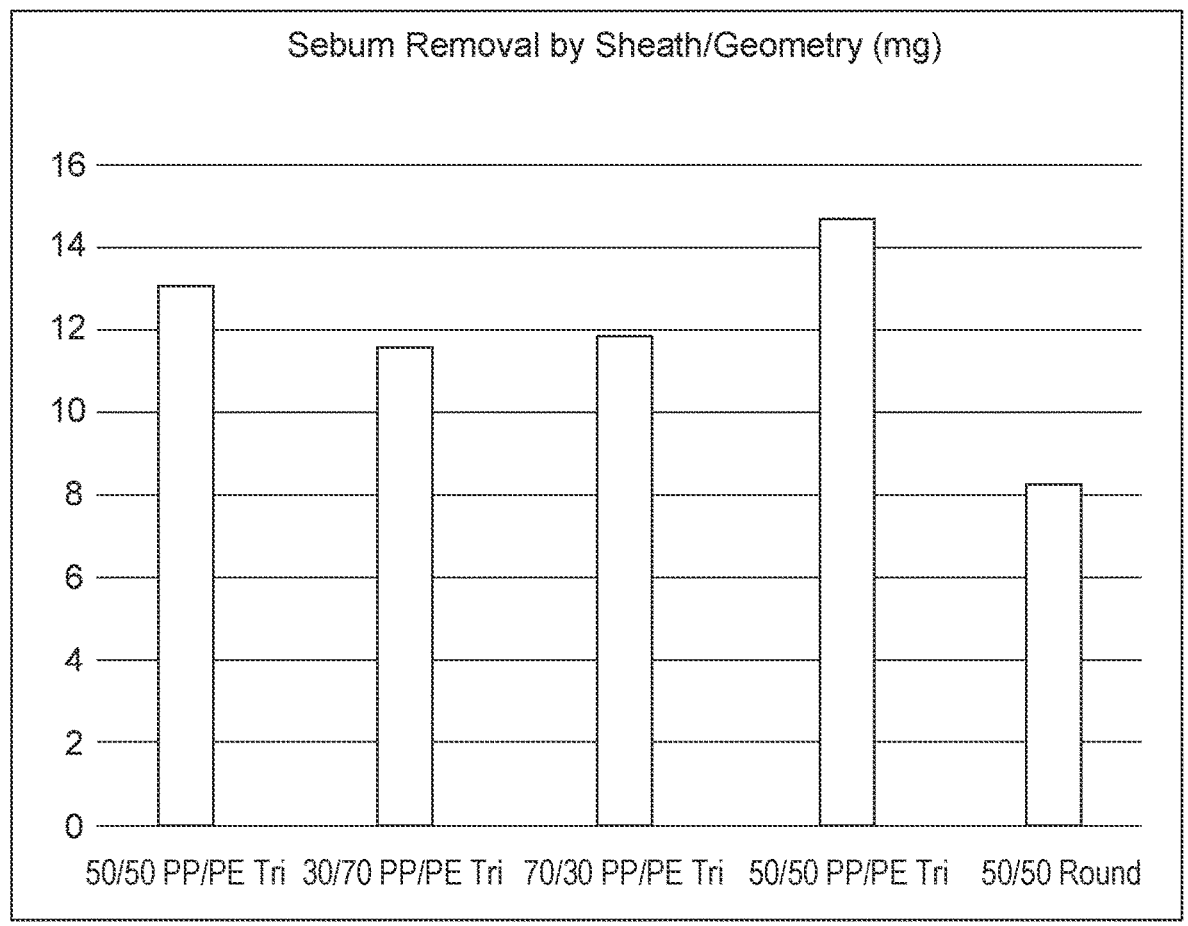
FIG. 13 is a chart illustrating the effects of fiber configuration on sebum removal.

This example demonstrates the importance of selecting a suitable fiber for use in the present hair cleaning implements. Nonwoven webs were formed from several different types of bicomponent fibers in a sheath/core configuration and then tested in the Sebum Removal Test to measure their ability to remove sebum. The fibers used in the nonwoven webs are shown below in Table 2. The ratios indicate the percent of polypropylene or polyethylene in the sheath or core. For example, 50/50 PP/PE indicates that the fibers are 50% by weight of a polypropylene sheath and 50% by weight of a polyethylene core. The results of the testing are summarized in Table 2 and illustrated in FIG. 13.

TABLE 2

| Fiber type | Sebum Removed (mg) |
|---|---|
| 50/50 PP/PE Trilobal | 13.1 |
| 30/70 PP/PE Trilobal | 11.6 |
| 70/30 PP/PE Trilobal | 11.9 |
| 50/50 PE/PP Trilobal | 14.75 |
| 50/50 Round | 8.25 |

What is claimed is:
1. A hair cleaning implement, comprising:
   a) a first nonwoven material layer comprising a first surface, an opposing second surface, and a plurality of fibers;
   b) a film material layer comprising a first surface and an opposing second surface, wherein at least a portion of the first surface of the film material is joined to at least a portion of the second surface of the first nonwoven material layer to form a laminate; and
   c) a plurality of discrete protrusions extending outwardly from the first surface of the nonwoven material, wherein the first surface of the nonwoven material layer of the implement has an Smean of about 0.001 and 0.01, an Spd of less than about 0.17, and a Vvv of less than about 0.03, according to ISO 25178.
2. The hair cleaning implement of claim 1, wherein the fibers are core/sheath type fibers.
3. The hair cleaning implement of claim 2, wherein the core/sheath type fibers comprise a polypropylene core and a polyethylene sheath.

4. The hair cleaning implement of claim 3, wherein the core/sheath type fibers are trilobal fibers.

5. The hair cleaning implement of claim 1, wherein the hair cleaning implement provides an average sebum removal of at least about 5 mg, according to the Sebum Removal Test.

6. The hair cleaning implement of claim 5, wherein the hair cleaning implement provides an average sebum removal of at least about 6 mg.

7. The hair cleaning implement of claim 6, wherein the hair cleaning implement provides an average sebum removal of at least about 7 mg.

8. The hair cleaning implement of claim 1, wherein the first surface of the nonwoven material layer of the implement has an Spd of less than about 0.1.

9. The hair cleaning implement of claim 1, wherein the first surface of the nonwoven material layer of the implement has a Vvv of less than about 0.025.

10. The hair cleaning implement of claim 1, wherein the laminate is mechanically deformed such that the first nonwoven material layer and the film material layer are nested within a protrusion.

11. The hair cleaning implement of claim 10, wherein said protrusions are substantially hollow.

12. The hair cleaning implement of claim 11, wherein each protrusion comprises a base proximate the first surface of the nonwoven material and an opposed distal end in the form of a cap, wherein the base has a maximum interior base width and the cap has a maximum interior cap width, and the maximum interior cap width is greater than the maximum interior base width.

13. The hair cleaning implement of claim 1, wherein the film material layer is joined to the first nonwoven material layer with an adhesive.

14. The hair cleaning implement of claim 13, wherein the adhesive is applied in a spiral pattern.

15. The hair cleaning implement of claim 1, further comprising a second nonwoven material layer joined to the laminate to form a pocket between the film material layer and the second nonwoven material layer, wherein the pocket is configured to receive at least a portion of a hand of a user.

16. A method of removing sebum from hair, comprising:
    a) identifying a target portion of hair where sebum removal is desired; and
    b) contacting the target portion of hair with the hair cleaning implement of claim 1.

17. The method of claim 16, further comprising applying a hair cleaning composition to the hair cleaning implement.

18. A hair cleaning kit, comprising:
    a) the hair cleaning implement of claim 1; and
    b) a hair cleaning composition.

19. The hair cleaning kit of claim 18, further comprising a hair conditioning composition.

\* \* \* \* \*